Feb. 3, 1931.  K. E. PEILER  1,791,323

METHOD OF AND APPARATUS FOR GLASS WORKING

Filed Sept. 18, 1929

Witness:
Jas. G. White

Inventor
Karl E. Peiler
by Brown & Parham
Attorneys

Patented Feb. 3, 1931

1,791,323

UNITED STATES PATENT OFFICE

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE

METHOD OF AND APPARATUS FOR GLASSWORKING

Application filed September 18, 1929. Serial No. 393,419.

This invention relates to methods of, and apparatus for, fabricating of glassware, and more particulary to the separation from a supply pool of molten glass of a charge that has been drawn by suction into a parison mold or other gathering receptacle and to the preliminary blowing or partial expansion of the gathered glass to form a parison.

One mode of procedure which is followed in forming glass parisons consists in dipping a parison mold into a pool of glass, gathering a charge of glass in the parison mold and an associated neck mold by suction, and severing the string or tail of glass from the charge by means of a shear blade as the charged mold is moved away from the gathering pool. The shear blade may be held in engagement with the bottom of the parison mold to support the charge while the charge is subjected to preliminary blowing pressure. This method is not altogether satisfactory because shear marks frequently appear on the parisons and cause defects in the finished ware. Such shear marks may be due to the fact that it is difficult, as a practical matter, to provide for accurate sliding engagement of the shear blade with the bottom of the parison mold. When the string or tail of glass is cut, the bottom of the charge usually is smeared, and this defect is not always entirely removed by the subsequent shaping operations.

It is highly desirable to enlarge the initial blowing cavity, which generally is formed in the parison by means of a neck pin. By enlarging the preliminary cavity to form a relatively large bubble, not only is the final blowing of the parison facilitated, but the glass of the parison will be forced into intimate contact with the walls of the parison mold cavity, thereby tending to effect uniform and relatively rapid chilling and setting of the glass. In addition, a more homogeneous distribution of the glass in the parison may be obtained, and it is possible to more accurately control the formation of the shoulders of the parison.

An object of the invention is to practically obviate or at least substantially reduce shear marks and scars on suction gathered mold charges.

A further object of the invention is to provide an improved method of and apparatus for gathering charges of glass in a suction gathering receptacle, whereby not only may the gathered charge be separated from the supply pool without harmfully marking or scarring the glass but space also will be provided to permit preliminary blowing and partial expansion of the glass in the gathering receptacle.

In accordance with this invention, a parison mold and associated neck mold may be filled with glass from a supply pool by suction in the usual manner. The mold with the gathered glass retained therein by suction then is raised to attenuate the connecting glass between the charge and the pool. An auxiliary mold section, having an opening therein of suitable shape, is brought into engagement with the bottom of the parison mold. The opening in the auxiliary mold section, which encircles the attenuated glass between the charge and the pool, is aligned with the cavity in the parison mold, and preferably is sufficiently large to provide a space for the reception and preliminary shaping of the lower end portion of the charge after such charge has been separated from its tail or connecting glass and is being partially expanded by preliminary blowing pressure applied at the upper end of the gathering mold. The auxiliary mold section also constitutes a shear plate and a shear blade is arranged to cooperate therewith to shear the charge from the attenuated glass at the plane of the lower surface of the auxiliary mold section. The attenuated connecting glass between the gathered charge and the supply pool thus may be severed at substantially its thinnest part, thus reducing the possibility of the formation of harmful shear marks or scars. The shear blade may be retained in engagement with the bottom of the mold while preliminary blowing air is introduced into the neck mold. Because of the provision initially of the space around the glass in the auxiliary mold section, the preliminary blowing and partial expansion of the glass charge may proceed until the glass has been forced into intimate contact with all walls of the cavity of the mold and until a parison having a relatively large bubble or blowing cavity has been formed. The forcing of relatively hot glass into the space initially provided at the bottom of the mold also will serve to eliminate any slight mark that may have been caused by the severing operation.

My novel method and apparatus permits the preliminary blowing of the parison as described above while the glass still is relatively hot so that the uniform distribution of the glass in the parison, and the removal of the shear mark, may readily be accomplished.

In order that the invention may readily be comprehended, and its manifold advantages understood, reference should be had to the accompanying drawings, in which the several figures show apparatus by which the method of my invention may be practiced, and illustrate several steps in the performance of said method.

Referring in detail to the drawings, the cooperating halves of a parison body mold are shown at 10. A cavity 11 is provided in this mold for the reception of glass of a charge, which may be collected by suction from a gathering pool 12. A divided neck mold 13 cooperates with the upper portion of the parison body mold and with a neck pin 14 to receive the glass for the neck portion of the parison. A vacuum and blow head structure also is provided, a portion thereof being shown at 15 in engagement with the neck mold 13. Preferably, the parison mold unit is supported by means (not shown) for raising and lowering the unit and moving it toward and away from the gathering pool.

Figure 2:
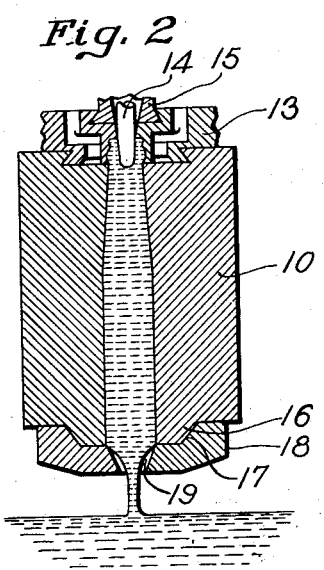
Fig. 2 is a view similar to Fig. 1, showing the parison mold and associated neck mold completely filled with glass, after the molds have been raised from the gathering pool, and an auxiliary or bottom mold section has been brought into engagement with the bottom of the parison mold.

The bottom of the parison mold is provided with a frustro-conical projection 16 which fits into a recess 17 that is provided in the top of the combined auxiliary or bottom mold section and shear plate 18. The mold section 18 may be formed in sections and opened and closed by suitable means (not shown). The projection 16 and recess 17 serve to position and maintain the bottom mold section in alignment with the parison body mold. Said section 18 may be of hardened steel, and has an opening 19 therein which is aligned with, and forms an extension of, the cavity of the parison body mold when said molds are in engagement, as shown for example in Figs. 2, 3 and 4. The opening 19 may be of any desired shape, but preferably is sufficiently large to permit the subsequent partial expansion and preliminary shaping of the gathered glass. A shear blade 20 of known construction is provided for cooperating with the plate section 18 to sever the charge from its tail or connection with the supply pool. The blade 20 preferably is adapted to be held in engagement with the plate section 18 to provide a bottom closure against which the gathered glass may be forced during the preliminary blowing of such glass.

The thickness of the auxiliary mold 18, and hence the depth of the opening 19, may be reduced to compensate for increase in the volume of the parison mold cavity 11.

Figure 1:
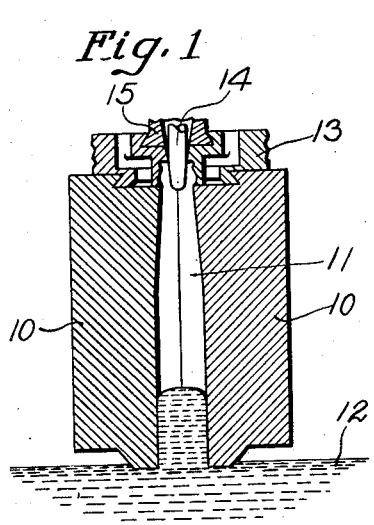
Figure 1 is a view in vertical transverse section, showing a parison mold being filled with glass while in contact with the surface of a gathering pool.
Figure 3:
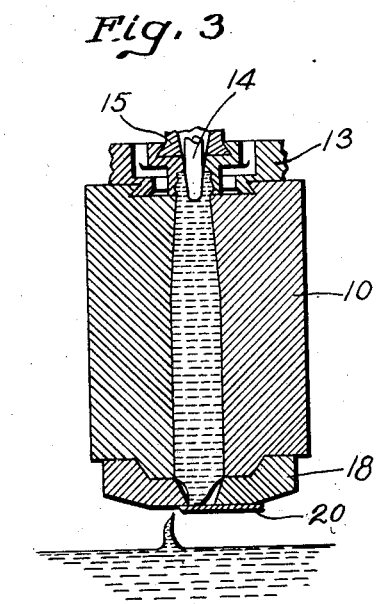
Fig. 3 is a view similar to Fig. 2, showing a shear blade in the position which it occupies after the gathered charge has been severed from the attenuated glass leading from the pool.
Figure 4:
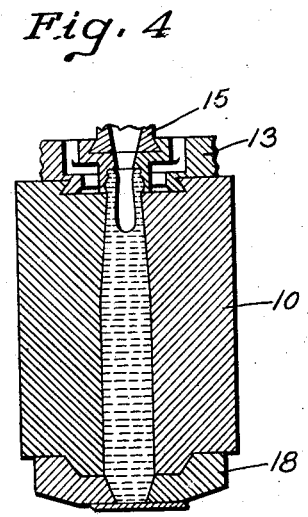
Fig. 4 is a view similar to Fig. 3, but showing the parts of the apparatus in the positions which they occupy for the application of preliminary blowing pressure to the glass to form a parison.

One preferred mold of operation of the above described apparatus which may be followed in practicing the method of the present invention is as follows:

The parison mold is lowered into contact with the surface of the gathering pool 12, and a vacuum is created in the parison body mold, and neck mold, through the blow head 15. At this time, the various parts of the apparatus may occupy the positions in which they are shown in Fig. 1. During the filling of the parison mold, the neck pin may be projected downwardly as shown in Fig. 1, or may be held retracted to permit rapid filling of the parsion mold. As the glass rises above the top portion of the parison mold, it surrounds the neck pin 14 and fills the neck mold. Subsequently the mold unit is raised out of contact with the glass in the gathering pool, and the mold section 18 is closed in engagement with the bottom of the parison mold, as shown for example in Fig. 2. At this time, the bottom of the charge in the parison mold, and the attenuated glass depending therefrom, extend through the opening 19 of the mold section 18. The shear blade 20 now cooperates with the section 18 to cut the string of glass and closes the bottom of the opening 19, as illustrated in Fig. 3.

It will be observed that by reason of the presence of the mold section 18, the string will be severed at substantially its thinnest part in a plane some distance below the bottom of the parison body mold 10. Consequently, there will be little tendency for the formation of a shear mark on the bottom of the charge. After the shear blade closes the bottom of the complete mold assembly, as shown for example in Fig. 4, the neck pin 14 may be raised and preliminary blowing air admitted through the blow head 15 to partially expand and preliminarily shape the charge in the complete parison mold assembly, glass thereof being forced downwardly and outwardly in the opening 19 against the wall of said opening, and against the top of the shear blade. As a result, the bubble or initial blowing cavity is enlarged and any shear mark which may be present is obliterated as a result of the movement of the glass in the lower portion of the charge, which now forms the bottom portion of the parison. The expansion or enlarging of the bubble assists in the formation of the shoulders at the neck portion of the parison, and causes a desirable distribution of the glass throughout the parison. The shaping of the bottom portion of the charge is aided by the auxiliary mold and shear blade which prevent said portion from becoming unduly chilled. Any shear mark which may be present is prevented from becoming set in the glass. When the parison is completed, as shown for example in Fig. 4, the shear blade is removed from engagement with the mold section 18, the latter 18 is opened, and the parison body mold is opened to permit transfer of the parison to a finishing mold (not shown) in which the parison will be blown to final shape, in any suitable known manner.

I have not undertaken to illustrate in detail the mechanisms for raising and lowering the mold units, and for operating the three molds, the neck pin, and the shear blade. Mechanisms for effecting such movements of the aforesaid parts may readily be provided by one skilled in the art. It is to be understood that the invention is not limited to the exact construction and method disclosed herein, but changes in details of construction of the apparatus, and in the manner of performing the method, may be made without departing from the principles of the invention, as set forth in the appended claims.

Certain features of the present invention are disclosed and claimed broadly in my copending applications No. 24,789, filed April 21, 1925, and No. 316,982, filed Nov. 3, 1928, of which this application is a continuation in part.

Having thus described my invention, what I desire to claim and to secure by Letters Patent is:

1. The method of gathering and imparting a preliminary shape to a charge of molten glass, which comprises lowering a suction gathering receptacle to the surface of a gathering pool of molten glass, filling said receptacle with glass from the pool by suction, raising the receptacle and the gathered glass to attenuate the connecting glass between the receptacle and the pool, disposing a shaping enclosure against the lower end of said receptacle and in spaced enclosing relation to a portion of the attenuated glass, severing the attenuated glass and confining the lower end of the severed glass within said enclosure.

2. The method of forming a glass parison, which comprises lowering a parison mold to the surface of a gathering pool of molten glass, filling the cavity of the parison mold with glass from the pool by suction, raising the parison mold and the glass therein to attenuate the glass between the lower end of the mold and the pool, disposing an auxiliary annular mold against the lower end of the parison mold and in spaced encircling relation to the adjacent attenuated portion of glass, severing the attenuated glass close to the lower surface of the auxiliary mold and confining the lower end of the severed glass within said auxiliary mold, and introducing preliminary blowing pressure at the upper end of the mold into the gathered glass to blow a relatively large cavity in such glass and to force the gathered glass into intimate contact with all portions of the inner walls of the parison mold and said auxiliary mold.

3. The method of forming a glass parison which comprises, gathering a charge of glass from a supply pool in a parison mold and associated neck mold by suction, then placing an annular glass shaping member in engagement with the bottom of the parison mold and around the connecting glass between the gathered glass and the pool, and severing the gathered charge of glass in said mold from the connecting glass below said shaping member.

4. The method of forming a glass parison which comprises, gathering a charge of glass in a parison body mold from the surface of a gathering pool by suction, placing an auxiliary mold in engagement with the bottom of the parison body mold and in spaced encircling relation to the glass between the parison body mold and the pool, severing the connecting glass close to the auxiliary mold, closing the bottom of the auxiliary mold, and partially expanding the glass in said parison body mold and said auxiliary mold.

5. The method of forming a glass parison which comprises, gathering a charge of glass in a parison body mold from the surface of a gathering pool by suction, moving an auxiliary mold into engagement with the bottom of the parison body mold and into position to surround a portion of the gathered glass after the charge has been gathered but before its separation from the glass of the pool, severing the string from the gathered glass by means of a shear blade and the auxiliary mold, and forming a parison by partially expanding the glass in the body auxiliary mold while holding the shear blade in engagement with the auxiliary mold.

6. The method of forming a glass parison which comprises, filling a parison body mold by suction with glass from the surface of a gathering pool, placing a shaping enclosure around the glass at the lower end of the parison body mold, severing the glass thus enclosed from the glass of the pool, closing the bottom of said enclosure, and partially expanding the glass in said parison mold and said enclosure by blowing air applied to the upper portion of the gathered glass.

7. The method of forming glass parisons which comprises, gathering a charge of glass in a parison mold and associated neck mold from the surface of a gathering pool by suction, forming an initial blowing cavity in said charge of glass, severing the string of glass connecting the charge with the glass in the pool at a plane removed from the bottom of the parison mold, leaving a portion of the glass projecting below the bottom of the parison mold, and simultaneously preliminarily shaping the gathered glass to form the parison and to enlarge the initial blowing cavity in said parison.

8. The method of forming glass parisons which comprises, gathering a charge of glass in a parison mold from the surface of a gathering pool by suction, forming an initial blowing cavity in the charge of glass, severing the string of glass connecting the charge with the glass in the pool at substantially the thinnest part thereof, leaving an unshaped portion of glass projecting below the bottom of the parison mold, preliminarily shaping said portion of glass and additional glass from above to form the bottom portion of the parison, and enlarging the initial blowing cavity in said parison.

9. Apparatus for forming glass parisons comprising, a parison mold for gathering a charge of glass by suction, an auxiliary mold for engaging the bottom of said parison mold after the charge is gathered, and adapted to encircle the string of glass depending from the charge, a shear blade for severing the string of glass at a plane substantially coincident with the bottom of said auxiliary mold, whereby a portion of unshaped glass is enclosed by said auxiliary mold, and means for partially expanding the gathered glass to force a portion thereof into the auxiliary mold to form the bottom of a parison.

10. Apparatus for fabricating glass parisons comprising a parison mold for gathering a charge of glass from the surface of a gathering pool by suction, an auxiliary mold for engaging the bottom of the parison mold, after the charge is gathered, and for encircling the string of glass connecting the charge with the glass in the gathering pool, said mold having an opening formed therein which forms a continuation of the cavity in the parison mold when the molds are in engagement, a shear blade for severing the string of glass at a plane substantially coincident with the bottom of the auxiliary mold, and for covering the bottom of the opening in the auxiliary mold, a neck pin for forming an initial blowing cavity in the charge of glass, and a blow head for admitting preliminary blowing air into said cavity to enlarge said cavity and to shape the bottom of the charge in said auxiliary mold.

11. Apparatus for fabricating glassware comprising a parison mold for obtaining a charge of glass from the surface of a gathering pool by suction, and an auxiliary mold for engaging the bottom of said parison mold after the charge has been gathered, said auxiliary mold having an opening therein constituting a continuation of the parison mold when said molds are in engagement, and said auxiliary mold being adapted to encircle a string of glass connecting a charge in the parison mold with the glass in the pool from which said charge has been gathered.

12. Apparatus for fabricating glassware comprising a parison mold for gathering a charge of glass from the surface of a gathering pool by suction, an auxiliary mold for engaging the bottom of said parison mold after the charge has been gathered, and for encircling a string of glass connecting the gathered charge with the glass in said pool, and means for maintaining said molds in alignment with each other.

Signed at Hartford, Connecticut, this 16th day of September, 1929.

KARL E. PEILER.